Aug. 27, 1940.   E. B. HUDSON   2,212,738
APPARATUS FOR DETERMINING OPERATING CONDITIONS
IN TANDEM TRAINS OF ROLLING MILLS
Filed Feb. 16, 1939    4 Sheets-Sheet 1

Inventor.
EDWIN B. HUDSON.
By
Allen & Allen
Attorneys.

Aug. 27, 1940.  E. B. HUDSON  2,212,738
APPARATUS FOR DETERMINING OPERATING CONDITIONS
IN TANDEM TRAINS OF ROLLING MILLS
Filed Feb. 16, 1939  4 Sheets-Sheet 3

Inventor
EDWIN B. HUDSON.
By Allen & Allen
Attorneys.

Patented Aug. 27, 1940

2,212,738

UNITED STATES PATENT OFFICE 2,212,738

APPARATUS FOR DETERMINING OPERATING CONDITIONS IN TANDEM TRAINS OF ROLLING MILLS

Edwin B. Hudson, Middletown, Ohio, assignor to The American Rolling Mill Company, Middletown, Ohio, a corporation of Ohio Application February 16, 1939, Serial No. 256,770

6 Claims. (Cl. 80—35)

This invention relates to a method and apparatus for determining various operating conditions encountered in strip mills. When a strip of metal is being rolled through a number of stands of mills so that the strip may be engaged by one or more of the mills at the same time, it is desirable to know a number of operating conditions, as, for example, the gauge of the strip at various points in the mill, the elongation which is being produced, the actual mill speeds, the relation of mill speeds to strip speeds, and the power requirements of the individual stands of mills. To my knowledge, there is not known at the present time any method or apparatus for determining these conditions.

The invention is particularly advantageous in connection with rolling of hot strip at high speeds since it is not practicable under these conditions to gauge the strip delivered from the last mill unless the strip is stopped on the delivery table or after the strip is coiled.

It is an object of my invention therefore to provide a method and means in the form of apparatus whereby the gauge of the strip may be determined and controlled by controlling the gauge at one of the earlier passes when the strip is running slowly and is of greater thickness. When this is done, means are provided according to my invention for determining the gauge of the strip as it passes through each of the remaining mills.

It is another object of my invention to provide means for indicating the elongation, the mill speeds, the relation of mill speed to strip speeds, and the power requirements of the individual mills.

Another object of my invention includes the provision of means whereby all the necessary information is compiled over a fixed period of time. Further objects of my invention include the provision of means whereby data may be ascertained which is valuable in the daily operation of the mill in controlling gauge, in distributing work between the various mills, in compiling information as to power requirements for the various percentages of production, and the determination of the energy required to displace a given amount of metal under various operating conditions.

These and other objects of my invention which will be pointed out in more detail hereinafter, or which will be apparent to one skilled in the art upon reading these specifications, I accomplish by that certain construction and arrangement of parts of which I shall now describe exemplary embodiments. Reference is now made to the drawings forming a part hereof and in which.

While the ordinary mill finishing train generally consists of five or six mills, for purposes of simplicity I have described the invention in connection with a three-mill tandem train. The application of the invention to any desired number of mills involves merely the addition of duplicate parts.

Briefly, in the practice of my invention, I provide means for measuring various functions, such as the passage of strip past a given point, the passage of roll surface past a given point, and power consumption of individual mills. I then provide means whereby these various measuring devices are rendered operative for a relatively short predetermined period of time so that by appropriate gearing the measurement of the passage of strip may be converted into a reading of feet per minute, and the roll speed may be indicated as lineal feet per minute, and the power consumption may be indicated as kilowatt hours.

I have shown two different arrangements on account of the fact that two different conditions may occur. In rolling long lengths of strip, there will be a period after the leading end of the strip has passed through all the mills and before the tail end of the strip has left the first mill during which period the strip is being acted upon by all of the mills at the same time. In another condition, where short lengths of strip are being rolled, the tail end of the strip may pass out of the first or second stand of mills before the leading end has entered the last stand so that there is no time during which the strip is being acted upon by all the mills, so that a single reading could be taken. In the latter case, of course, I provide for progressive readings.

Figure 1:
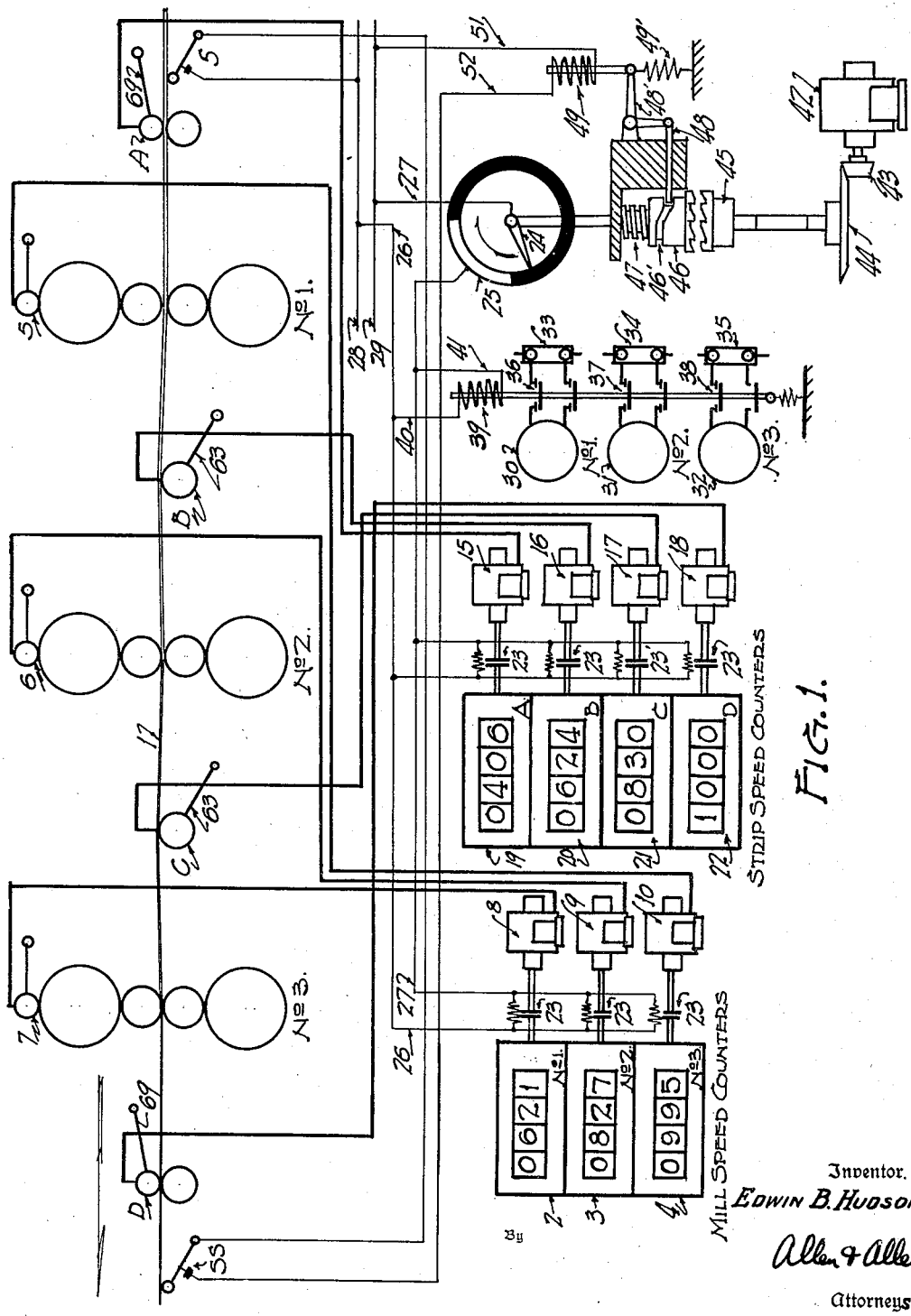
Figure 1 is a diagrammatic layout of a three-mill train in which the strip during at least a part of the operation is in all the mills at the same time, and showing the various electrical connections.
Figures 9, 10:
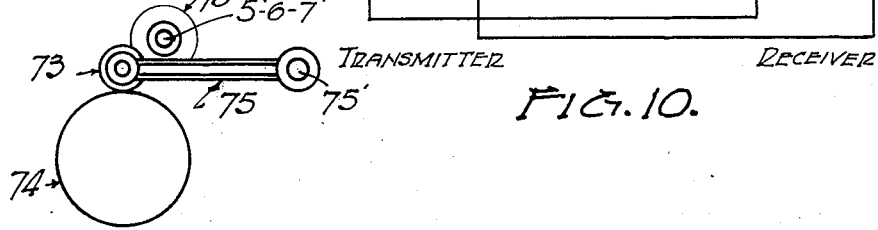
Figure 9 is an elevational view of Figure 8.
Figure 10 is a schematic wiring diagram showing the manner in which the Selsyn transmitters and receivers are electrically connected.

Referring first to Figure 1 which shows an arrangement appropriate for the first mentioned condition, I have shown three mills, Nos. 1, 2 and 3, arranged in tandem with the strip being rolled from right to left as seen in the drawings. Three mill speed counters indicated respectively at 2, 3 and 4 are provided which are appropriately geared so that over a given period of time they will give a reading of feet per minute. Preferably, although without limitation, the period of time may be 15 seconds. In other words, after the counters have run for 15 seconds, their readings will indicate the feet per minute of the strip. These counters are driven in the following manner. Means are provided as generally indicated at 5, 6 and 7 respectively in connection with the mills for driving a Selsyn transmitter. The respective transmitters which are driven by means of rollers contacting the backing up rolls are connected to Selsyn receivers indicated at 8, 9 and 10 so that the rotation of the rollers 5, 6 and 7 is transmitted through the Selsyn system to the counters 2, 3 and 4. The wiring diagram for a Selsyn transmitter system is shown in Figure 10, but since it forms no part of my invention, it will not be described in detail. A magnetic clutch 23 is provided between each of the Selsyn receivers 8, 9 and 10, and the counters 2, 3 and 4 so that the counters will only be actuated when the clutches 23 are engaged.

The strip speed is similarly indicated by means of rollers A, B, C and D engaging the strip respectively at the entrance of the mill between the stands and at the exit end of the mill. The rollers A, B, C and D actuate respectively the counters 19, 20, 21 and 22 through the Selsyn receivers 15, 16, 17 and 18. Again the respective Selsyn receivers are connected to the respective counters through magnetic clutches 23 so that the counters only operate when the clutches are engaged.

For the recording of the power requirements of each of the mills, high speed reset watt hour meters 30, 31 and 32 are provided which are connected to shunts 33, 34 and 35 in the mill motor circuits. Switches 36, 37 and 38 are provided in connection with the meters so that all the meters are simultaneously connected and disconnected in the same instant of time. A solenoid 39 is provided for actuating the switches.

A timing arrangement is indicated at 24 and 25 in which the pointer 24 is arranged to rotate at 1 R. P. M. This is accomplished by means of a motor 42, gears 43 and 44, and a clutch at 45. The clutch 45 is arranged to be driven at 1 R. P. M. and means are provided for causing the pointer 24 to make a single revolution. These means involve a one-revolution clutch of more or less conventional design. The clutch has a movable body 46 which is urged into engagement with the body 45 by means of a spring 47. The body 46 is provided with a cam track 46' which is engaged by a pin 48, connected by a bell crank 48' to a solenoid 49. When the solenoid 49 is energized, the bell crank 48' is rocked in a counter-clockwise direction against the tension of the spring 49' for an instant, as will be described hereinafter, thus withdrawing the pin 48 momentarily from the groove 46'. Thereupon the spring 47 urges the jaw 46 into engagement with the jaw 45 and the revolution of the pointer commences. As soon as the clutch has made approximately half a revolution, the pin 48 will be able to re-enter the cam groove 46' and the jaw 46 will thus be withdrawn from engagement with the jaw 45 at the end of a single revolution. As will be clear from the drawings, the member 25 has a 90° contact element so that during the passage of the pointer 24 over this 90° segment, a contact will be established. When this occurs, a circuit is established from the line 29, through the pointer 24 and the segment 25, line 27, line 41 to the solenoid 39, and through line 40 and line 26 to the line 28. Thus it will be clear that the watt hour meters 30, 31 and 32 will operate during the 15 second interval. Likewise, a circuit is established from line 27 through all of the magnetic clutches 23 which are connected in parallel, and through the line 26 back to the line 28, so that during the 15 second time interval, the counters 2, 3, 4, 19, 20, 21 and 22 will function. The watt hour meters may be arranged to give simply a 15 second reading, or they may be geared up to give hourly readings. The counters 19, 20, 21 and 22 will indicate the strip speed in feet per minute before the train, between the stands and at the end of the train, and the counters 2, 3, and 4 will indicate the linear roll speed in feet per minute of the respective roll stands.

Figure 7:
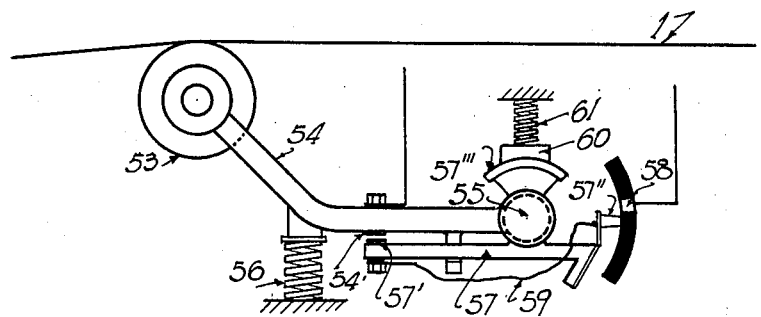
Figure 7 is a detail elevational view of a special control switch.

Means are provided before the roll A and after the roll D adapted to be actuated by the strip to complete a circuit to the solenoid 49 so that all the counting instrumentalities will be set into operation for their 15 second interval, and these means, as will now be described, include a provision preventing repeat operation. I have indicated at S in Figure 1 a simple strip actuated switch. This may be of any conventional construction and I have not illustrated it in detail. Suffice it to say that when a strip passes over it, a contact is established. A study of the wiring diagram in Figure 1 will indicate that the contact must also be established by the special switch SS before the solenoid 49 is energized. The special switch is shown in detail in Figure 7, and it is this switch which includes the non-repeat feature. An arm 54 is pivoted at 55 and carries a strip contacting roller 53. This arm is urged upwardly by means of a spring 56 and is provided with a curved braking surface 57''' which is engaged by brake shoe 60 urged thereagainst by spring 61. A second arm 57 is also pivoted at 55 and carries a contact 57' in operative relationship with a contact 54' on the lever 54. The lever 57 also carries a contact 57'' in operative relationship with a segment contact 58. The contacts 57' and 57'' are connected by means of a shunt 59. When the roller 53 is depressed by the passage of a strip thereover, the contacts 54' and 57' are closed at the beginning of the downward movement of the lever 54 and when the contact 47'' passes the contact 58, the circuit to the solenoid 49 is momentarily closed. As soon as the contact 57'' passes the segment 58 the circuit is again broken. Now on the upward movement of the arm 54, as when the strip passes from the roller 53, the contacts 54' and 57' are opened and engagement of the contact 57'' with the contact 58 in its return passage will not again close the circuit to the solenoid 49.

Figure 3:
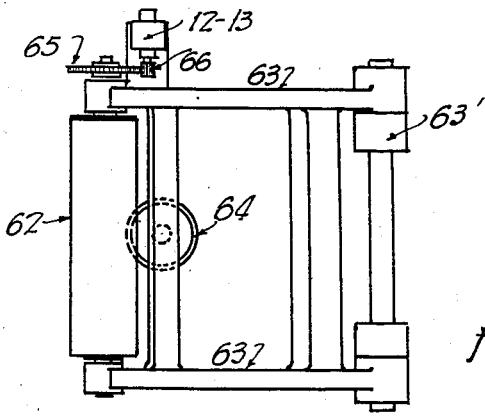
Figure 3 is a plan view of a Selsyn driving means located between the mills.
Figure 4:
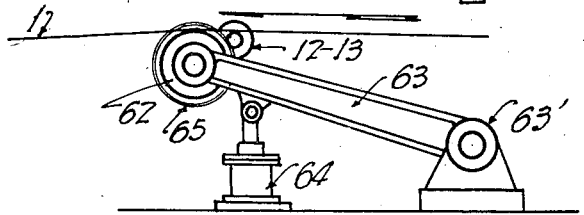
Figure 4 is an elevational view of Figure 3.

In Figures 3 and 4 I have illustrated the means for taking off the speed of the strip 1 between stands. As shown, it consists of a roller 62 which is arranged to contact the under side of the strip. The roller 62 is mounted in a frame 63 hinged at 63' and urged upwardly by an air cylinder 64. A gear 65 mounted on the shaft of the roller 62 drives the pinion 66 which drives the Selsyn transmitter 12 or 13 as the case may be.

Figure 5:
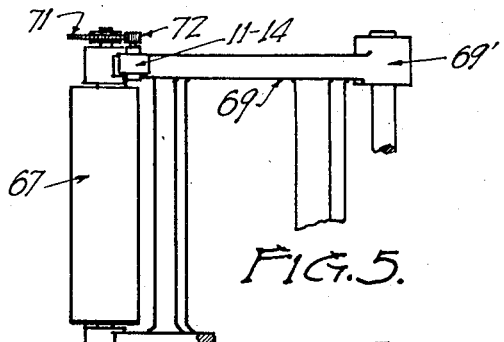
Figure 5 is a plan view of the Selsyn driving means before and after the mills.
Figure 6:
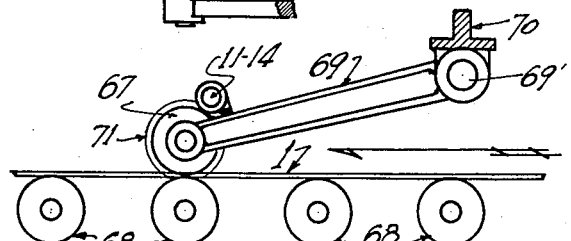
Figure 6 is an elevational view of Figure 5.

In Figures 5 and 6 I have shown the means for taking off the speed of the strip ahead of the No. 1 mill and behind the No. 3 mill. This arrangement is generally similar to that described above and consists of a roller 67 engaging the upper surface of the strip as it moves over the table rollers 68. The roller 67 is mounted in a suitable frame pivoted from an overhead circuit 70 at 69'. A gear 71 on the shaft of the roller 67 is, in engagement with a pinion 72 which drives the Selsyn transmitter 11 or 14 as the case may be.

Figure 8:
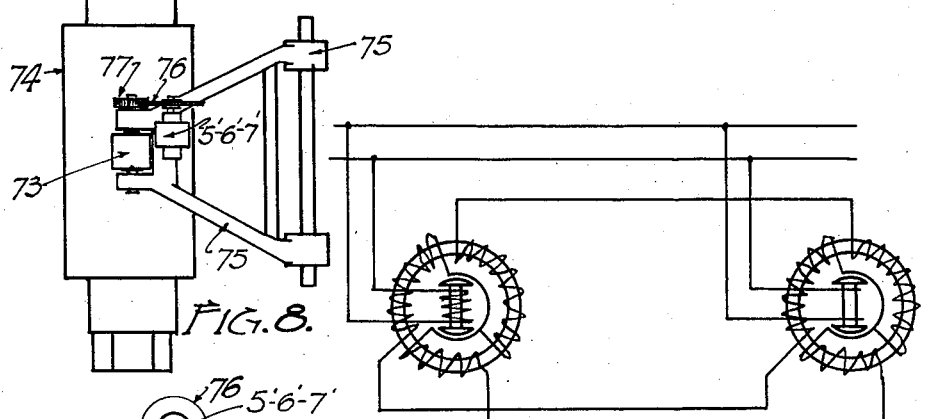
Figure 8 is a plan view of the Selsyn driving means for determining the mill speed.

Figures 8 and 9 illustrate the means for taking the surface speed of the mills. Here a contact roller 73 rides on the surface of the back up roll 74. The roller 73 is mounted in a suitable frame 75 pivoted at 75'. A gear 76 fixed on the shaft of the roller 73 engages with a pinion 77 to drive the Selsyn transmitters respectively 5', 6' and 7'.

From the description hereabove it will be clear that this invention may be applied to any number of mills by simply duplicating the parts in accordance with the number of mills whose operating conditions it is desired to ascertain.

Figure 2:
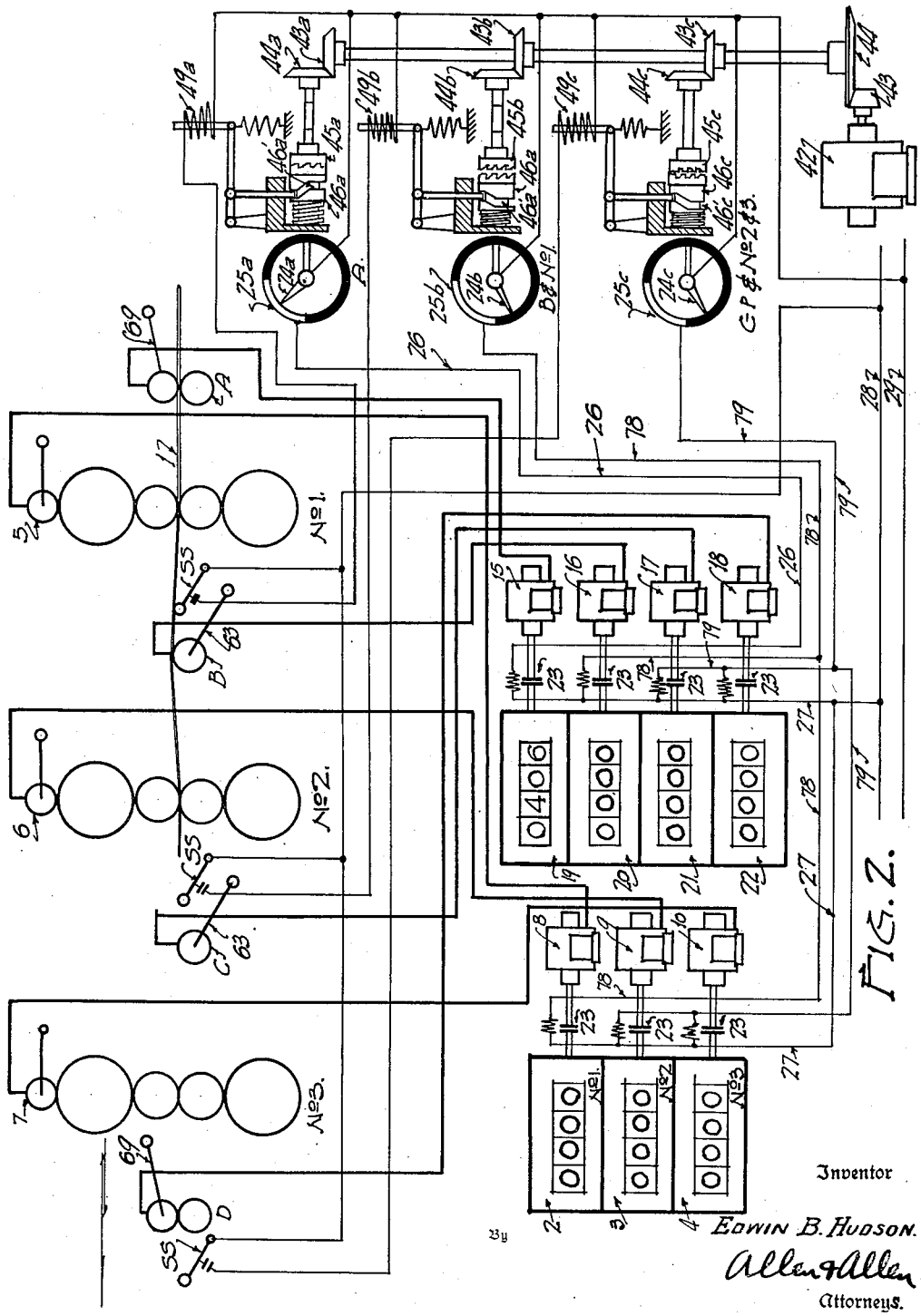
Figure 2 is a view similar to Figure 1 showing an arrangement where the strip is not in all of the mills at the same time.

Referring now to Figure 2 which illustrated a set-up for a condition where the strip is short and at the start may be in only one or two mills at the same time, and as it is reduced will lengthen so that it may ultimately be in three or four mills at a time, I have shown a modification which is suitable to the special case illustrated. The principles involved are the same as those described above, the only difference being that a number of timing devices are provided, and the various measuring instrumentalities are arranged to be actuated in sequence by the respective timing devices. In the particular case illustrated, as the strip enters the mill and passes through the first stand, it will actuate the first special switch SS. This completes a circuit from the main line 28 through the solenoid 49a and back to the line 29, thus energizing the timing device 24a, 25a. As will be clear from the diagram, a contact between 24a and 25a completes this circuit from line 29 through the timing device and line 26 to the revolution counter which is actuated by the roll A so that the first timing device produces only one indication. As the strip proceeds toward the left through the mill, it ultimately energizes the second switch SS. This completes a circuit to the timing device 24b, 25b. This timing device, when its circuit is closed, is arranged to energize through the line 78 the magnetic clutch for the counter driven by the roll B, and the magnetic clutch for the counter driven by the magnetic counter indicating the roll speed of No. 1 mill, the return being through the line 27 to the line 28. Thus the second timing device produces two indications, i. e., the strip speed between the first and second stands and the roll speed of No. 1 stand.

As the strip progresses further toward the left, and energizes the third special switch SS, a circuit is established to the solenoid 49c to the third timing device. When the contact 24c, 25c is made, a circuit is established through the line 79 to the revolution counters for the rolls C and D and for the revolution counters for No. 2 and No. 3 stands. Thus, by this time the strip is of a length that it will be in No. 2 and No. 3 stands at the same time and will extend beyond No. 3 stand sufficient to actuate the third special switch.

It will be clear that as more mill stands are added, and the strip is further elongated, it will be possible to take a greater number of readings at one time. For example, it might be possible under some conditions to add one more timing devise to take care of perhaps three more stands of mills.

Furthermore, it will be clear that the pointer 24 might be arranged to rotate at a different speed, and that the length of the segment 25 and the gear ratios may be selected in accordance with the demands of the particular installation.

It is to be understood that numerous modifications of my preferred method and apparatus will occur to those skilled in the art, and it will be understood that I do not intend to limit myself otherwise than as pointed out in the claims which follow.

Having now fully described my invention, what I claim as new and desire to secure by Letters Patent is:

1. In combination with a train of rolling mills, a plurality of means for measuring the surface speed of the rolls of the respective mills, comprising a plurality of means disposed in connection with the respective mills for measuring roll surface passing a given point in terms of length, a plurality of indicating means operatively connectible thereto, means for producing connection of said means respectively for a relatively short period of time, whereby speed functions are indicated by said indicating means, said connection producing means being arranged to produce connections of such of said respective means as are disposed in connection with mills through which a work piece is passing.

2. In combination with a train of rolling mills, a plurality of means for measuring the surface speed of the rolls of the respective mills, comprising a plurality of means disposed in connection with the respective mills for measuring roll surface passing a given point in terms of length, a plurality of indicating means operatively connectible thereto, means for producing connection of said means respectively for a relatively short period of time, whereby speed functions are indicated by said indicating means, said connection producing means being arranged to produce connections of such of said respective means as are disposed in connection with mills through which a work piece is passing, and means for rendering said connection producing means operative only once per work piece.

3. In combination with a tandem train of rolling mills, means for measuring the passage of a roll surface of each stand, means for measuring the passage of the strip at the entrance of the train, between the respective stands, and at the exit of the train, and means for measuring the work done by each stand of mills, means for measuring a predetermined period of time, and means operable during the measurement of said period of time for causing said roll surface, strip, and work measuring means to function, whereby readings of roll surface speed, the speed of said strip at the entrance of said train, between the respective stands and at the exit of said train, and the power requirements of the individual stands, may be obtained.

4. In combination with a tandem train of roll-mills, means in connection with each stand of mills for measuring roll surface passing a given point, means arranged at the entrance of said train, between the respective stands, and at the exit of said train, for measuring strip passing a given point, and means for measuring the work done by each stand, means for measuring a predetermined interval of time, means preventing operation of said time measuring means except when a strip is in all stands of the train at the same time and extends forwardly and rearwardly of said train, means preventing more than a single time measuring operation for a single strip, and means for causing said measuring means to function during said time interval whereby readings are obtained in terms of roll speeds, strip speeds, and power requirements.

5. In a tandem train of rolling mills, a series of Selsyn transmitters arranged to be driven by a roll of each stand of mills, a series of counters arranged to be driven by Selsyn receivers operatively connected to said Selsyn transmitters; a second series of Selsyn transmitters arranged to be driven by the strip at the entrance of said train, between the respective stands, and at the exit of said train, a second series of counters arranged to be driven by Selsyn receivers operatively connected to said second series of Selsyn transmitters; a series of watt hour meters appropriately connected in the respective mill motor circuits; magnetic clutches in said counter drives and a series of magnetic switches for said watt hour meters; means for measuring a predetermined time interval, means for insuring that said time interval is measured when said strip is in all stands of the train and extends forwardly and rearwardly thereof, and means operative during said time interval for energizing said magnetic clutches and switches, whereby readings are obtained per unit of time.

6. In combination with a tandem train of rolling mills, means for measuring the passage of a roll surface of each stand, means for measuring the passage of the strip at the entrance of the train, between the respective stands, and at the exit of said train, and means for measuring the work done by each stand of mills; a number of means for measuring a predetermined interval of time, an equal number of strip actuated means for producing operation of said respective time interval measuring means, said strip actuated means being distributed along said train; and means operative during the measurement of said time interval by the respective time interval measuring means for causing such of said roll surface, strip and work measuring means as are in operative relation to said strip during said time interval, to function.

EDWIN B. HUDSON.